US010407231B2

(12) United States Patent
Sugizaki et al.

(10) Patent No.: US 10,407,231 B2
(45) Date of Patent: Sep. 10, 2019

(54) SYNTHETIC RESIN BLOW MOLDED BOTTLE

(71) Applicants: Takumi Sugizaki, Tokyo (JP); Akihito Wakai, Tokyo (JP)

(72) Inventors: Takumi Sugizaki, Tokyo (JP); Akihito Wakai, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 130 days.

(21) Appl. No.: 15/490,116

(22) Filed: Apr. 18, 2017

(65) Prior Publication Data
US 2017/0341842 A1 Nov. 30, 2017

(30) Foreign Application Priority Data

May 26, 2016 (JP) ................. 2016-105437

(51) Int. Cl.
B65D 1/02 (2006.01)
B65D 79/00 (2006.01)
B29C 49/04 (2006.01)
B29C 49/08 (2006.01)
B29C 49/20 (2006.01)
B29L 1/00 (2006.01)
B29L 31/00 (2006.01)
B29K 23/00 (2006.01)
(Continued)

(52) U.S. Cl.
CPC ............ *B65D 79/005* (2013.01); *B29C 49/04* (2013.01); *B29C 49/08* (2013.01); *B29C 49/20* (2013.01); *B65D 1/0246* (2013.01); *B65D 1/0276* (2013.01); *B29C 49/06* (2013.01); *B29C 49/22* (2013.01); *B29C 2049/2043* (2013.01); *B29K 2023/06* (2013.01); *B29K 2023/12* (2013.01); *B29K 2067/003* (2013.01); *B29L 2001/00* (2013.01); *B29L 2031/7158* (2013.01)

(58) Field of Classification Search
CPC .... B65D 79/005; B65D 1/0223; B65D 1/023; B65D 1/42; B65D 1/44
See application file for complete search history.

(56) References Cited

U.S. PATENT DOCUMENTS

2002/0000421 A1* 1/2002 Ota ...................... B65D 1/0223
215/381
2003/0168426 A1* 9/2003 Yourist .................... B65D 1/46
215/382

FOREIGN PATENT DOCUMENTS

JP 2011-230829 A 11/2011

* cited by examiner

Primary Examiner — Stephen J Castellano
(74) Attorney, Agent, or Firm — Oliff PLC

(57) ABSTRACT

In a synthetic resin blow molded bottle, reduced pressure absorbing panel portions and column portions are formed alternately in the circumferential direction. Each column portion has a diameter that gradually increases downward and that remains substantially constant vertically. Each reduced pressure absorbing panel portion includes a pair of panel side edge portions, which is bent to the inner side from the adjacent column portions, a panel surface portion, which connects the pair of panel side edge portions, and a panel lower edge portion, which is bent to the outer side from a lower end edge of the panel surface portion. The panel surface portion of each reduced pressure absorbing panel portion includes a panel upper-side surface portion, whose diameter gradually increases downward, and a panel lower-side surface portion, which connects the panel upper-side surface portion and the panel lower edge portion and which has a substantially constant diameter vertically.

2 Claims, 5 Drawing Sheets

(51) Int. Cl.
*B29K 67/00* (2006.01)
*B29C 49/06* (2006.01)
*B29C 49/22* (2006.01)

SYNTHETIC RESIN BLOW MOLDED BOTTLE

TECHNICAL FIELD

The present disclosure relates to a synthetic resin blow molded bottle including reduced pressure absorbing panel portions.

BACKGROUND

Conventionally, a bottle is filled by using hot filling, where the bottle is filled with a content liquid, such as a beverage, at a high temperature for sterilization. A synthetic resin blow molded bottle, which may be filled using hot filling, is generally provided, in a trunk or a shoulder thereof, with reduced pressure absorbing panel portions to absorb (mitigate) reduced pressure that is generated inside the bottle when the content liquid is cooled after being filled at the high temperature (refer, for example, to Patent Literature 1). By the reduced pressure absorbing panel portions being deformed to absorb the reduced pressure generated inside the bottle, unsightly deformation and poor appearance of the bottle are prevented.

CITATION LIST

Patent Literature

PTL1: JP2011230829A

SUMMARY

However, even with the reduced pressure absorbing panel portions provided in the trunk, when the synthetic resin blow molded bottle has a small capacity of, for example, approximately 100 ml, due to a small trunk area, the bottle fails to provide a sufficient reduced pressure absorbing function. Furthermore, when the reduced pressure absorbing panel portions are provided in the shoulder as in the bottle described in Patent Literature 1, shoulder column portions, which are each shaped in a column extending between adjacent reduced pressure absorbing panel portions, tend to undergo depression and deformation.

The present disclosure has been developed in view of the above problems, and the present disclosure is to provide a synthetic resin blow molded bottle that advantageously provides the reduced pressure absorbing function especially when the bottle has a small capacity.

One of aspects of the present disclosure resides in a synthetic resin blow molded bottle including a cylindrical-shaped mouth, a shoulder that is contiguous with and below the mouth, a trunk that is contiguous with and below the shoulder, and a bottom that closes a lower end of the trunk. A plurality of reduced pressure absorbing panel portions and a plurality of column portions are formed alternately in a circumferential direction in a region extending from the shoulder to the trunk. Each of the plurality of column portions has a diameter that gradually increases downward in the shoulder and that remains substantially constant vertically in the trunk. Each of the plurality of reduced pressure absorbing panel portions includes a pair of panel side edge portions, which is bent to an inner side of the bottle from the column portions adjacent thereto, a panel surface portion, which connects the pair of panel side edge portions, and a panel lower edge portion, which is bent to an outer side of the bottle from a lower end edge of the panel surface portion. The panel surface portion of each of the plurality of reduced pressure absorbing panel portions includes a panel upper-side surface portion, whose diameter gradually increases downward, and a panel lower-side surface portion, which connects the panel upper-side surface portion and the panel lower edge portion and which has a substantially constant diameter vertically.

In a preferred embodiment of the synthetic resin blow molded bottle according to the present disclosure, a border portion between the panel upper-side surface portion and the panel lower-side surface portion in each of the plurality of reduced pressure absorbing panel portions has a height that substantially equals a height of a border portion between the shoulder and the trunk.

The present disclosure provides a synthetic resin blow molded bottle that advantageously provides the reduced pressure absorbing function especially when the bottle has a small capacity.

DETAILED DESCRIPTION

The following describes a synthetic resin blow molded bottle (hereinafter, may be simply called the "bottle") according to one of embodiments of the present disclosure in detail by way of illustration with reference to FIGS. 1 to 5. Additionally, in the description below, the "upper" refers to one end side on which a mouth 2 is located with respect to a trunk 4, and "lower" refers to the other end side opposite to the one end side on which the mouth 2 is located with respect to the trunk 4, that is to say, the other end side on which a bottom 5 is located with respect to the trunk 4.

A synthetic resin blow molded bottle 1 in the present embodiment may be formed by extrusion blow molding (EBM), in which a synthetic resin material, such as polyethylene terephthalate (PET), polyethylene (PE), and polypropylene (PP), is melted by heating and extruded into a tube, and the tube is surrounded by a mold and then injected with air to be molded into a hollow product. Instead of EBM, blow molding, such as biaxial stretch blow molding, in which a bottomed tubular-shaped preform (which is a precursor of the container) is molded into a hollow product, may also be employed to form the bottle 1. Furthermore, the bottle may have any layer structure, such as a single or a laminated layer structure.

Figure 1:
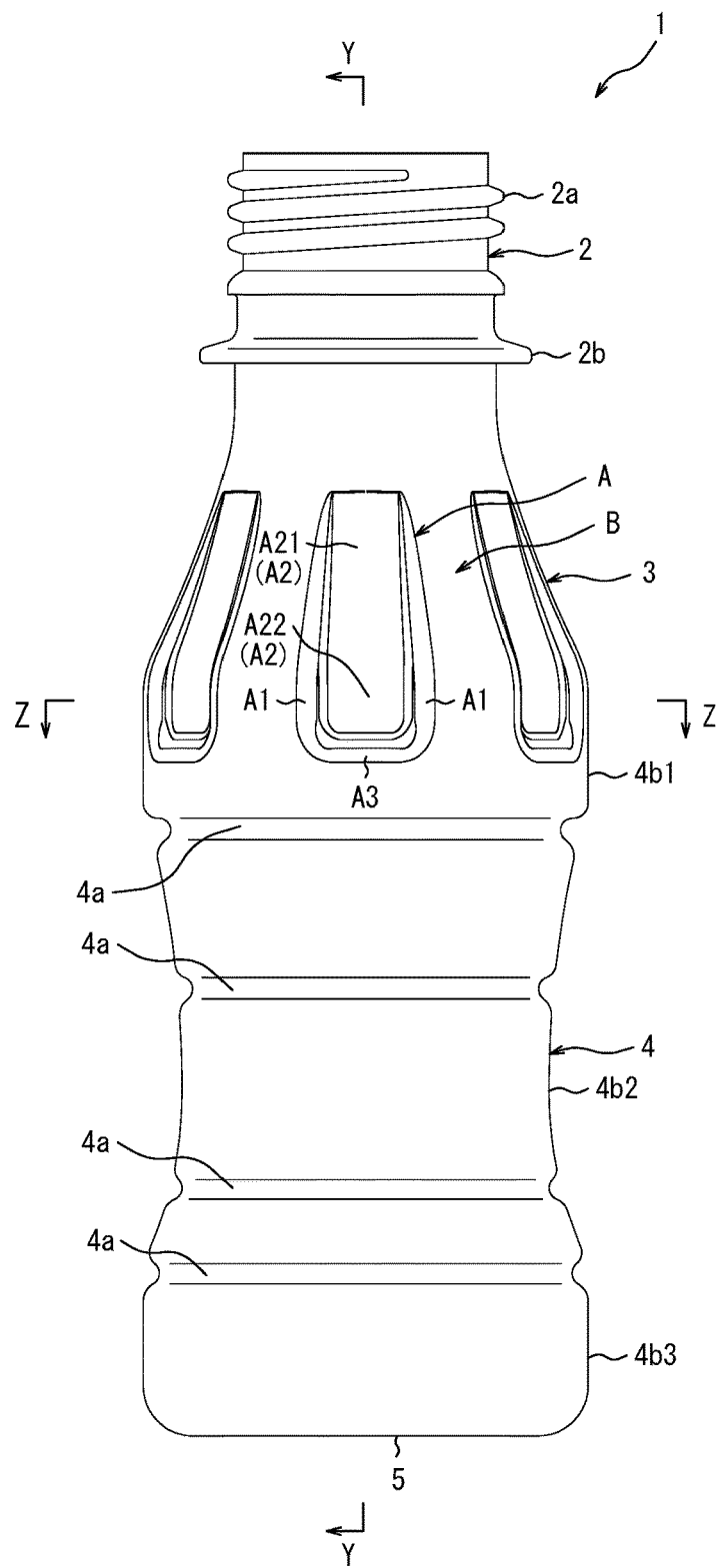
FIG. 1 is a side view illustrating a synthetic resin blow molded bottle according to one of embodiments of the present disclosure.
Figure 2:
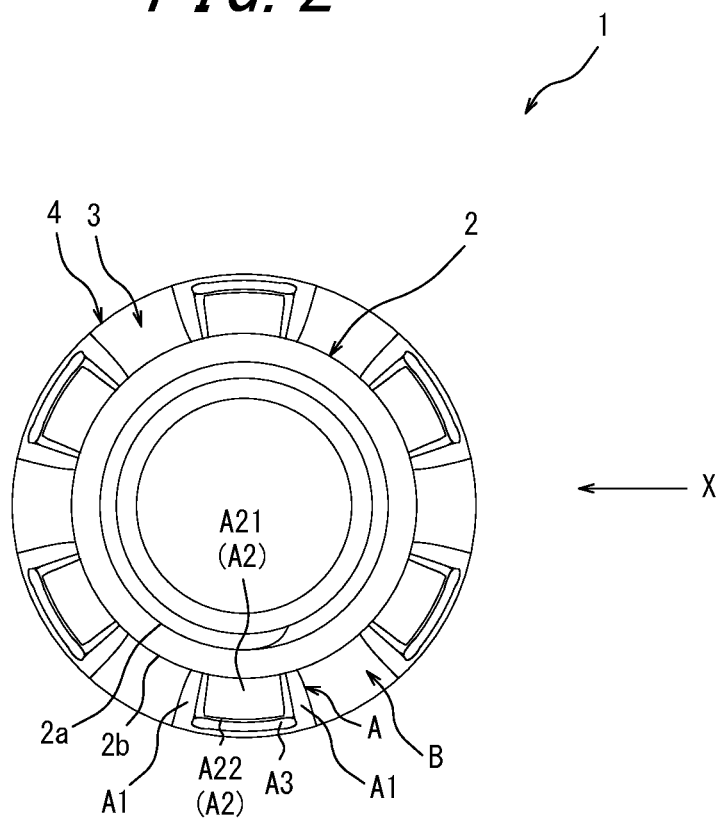
FIG. 2 is a plan view illustrating a synthetic resin blow molded bottle of FIG. 1.
Figure 3:
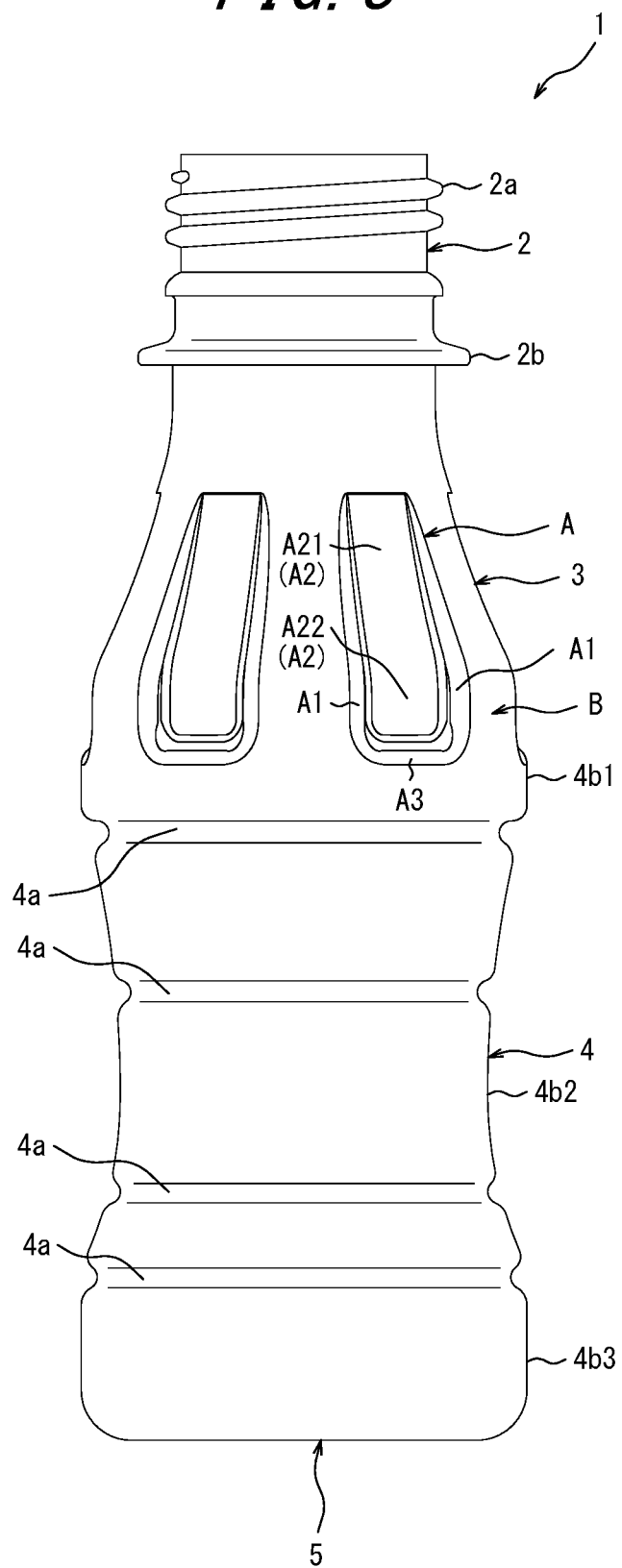
FIG. 3 is a side view illustrating a synthetic resin blow molded bottle as viewed from a direction of arrow X in FIG. 2.

As illustrated in FIG. 1, the synthetic resin blow molded bottle 1 in the present embodiment has a bottle shape including the cylindrical-shaped mouth 2, the shoulder 3, which is contiguous with and below the mouth 2, the trunk 4, which is contiguous with and below the shoulder 3, and the bottom 5, which closes a lower end of the trunk 4.

In the illustrated example, the bottle 1 has a capacity of approximately 100 ml, which is suitable for a beverage, such as a health drink, to be contained as the content liquid.

However, the bottle 1 in the present embodiment may also has a capacity of 100 ml or less, or, on the contrary, a capacity of, for example, 280 ml, 350 ml, or more.

Furthermore, in the illustrated example, the mouth 2 is provided with a screw portion 2a, to which a cap (which is not illustrated) is screw-fitted. However, instead of the screw portion 2a, an engagement projection to which the cap is fitted by plugging may also be provided. In the present embodiment, the mouth 2 is provided, in a position thereof that is located below the screw portion 2a, with an annular-shaped neck ring 2b.

As illustrated in FIGS. 1 to 5, in a region extending from the shoulder 3 to the trunk 4, a plurality of reduced pressure absorbing panel portions A and a plurality of column portions B are formed alternately in the circumferential direction. In the present embodiment, the shoulder 3, except for the reduced pressure absorbing panel portions A, has a tapered cylindrical shape whose diameter gradually increases downward from the mouth 2.

In the present embodiment, four annular-shaped peripheral grooves 4a are formed in the trunk 4. A trunk's upper portion 4b1, which is located above the uppermost peripheral groove 4a in the trunk 4, except for the reduced pressure absorbing panel portions A, has a substantially constant diameter vertically. Accordingly, in the present embodiment, each of the plurality of column portions B has a diameter that gradually increases downward in the shoulder 3 and that remains substantially constant vertically in the trunk's upper portion 4b1. That is to say, a longitudinal section (i.e., a section taken along a plane including the center axis of the mouth 2) of a border portion X2 (refer to FIG. 4) between the shoulder 3 and the trunk 4 is formed as a bent portion that is convex to the outer side of the bottle 1.

Additionally, the longitudinal section of each of the plurality of column portions B, whose diameter gradually increases downward in the shoulder 3, may have a linear or a curved shape (including a concave curve or a convex curve).

Herein, "having a substantially constant diameter vertically" encompasses cases where the trunk's upper portion 4b1 or the plurality of column portions B has a substantially constant diameter vertically (i.e., extends in a direction along the center axis of the mouth 2) and cases where the trunk's upper portion 4b1 or the plurality of column portions B has a diameter that gradually and slightly increases or decreases downward (i.e., extends in a direction inclined by ±10 degrees or less with respect to the direction along the center axis of the mouth 2).

The plurality of reduced pressure absorbing panel portions A each includes a pair of panel side edge portions A1, which is bent to the inner side of the bottle 1 from the column portions B adjacent thereto, a panel surface portion A2, which connects the pair of panel side edge portions A1, and a panel lower edge portion A3, which is bent to the outer side of the bottle 1 from a lower end edge of the panel surface portion A2.

The panel surface portion A2 included in each of the plurality of reduced pressure absorbing panel portions A includes a panel upper-side surface portion A21, whose diameter gradually increases downward, and a panel lower-side surface portion A22, which connects the panel upper-side surface portion A21 and the panel lower edge portion A3 and which has a substantially constant diameter vertically.

Herein, "having a substantially constant diameter vertically" encompasses cases where the panel lower-side surface portion A22 of each of the plurality of the reduced pressure absorbing panel portions A has a substantially constant diameter vertically (i.e., extends in the direction along the center axis of the mouth 2) and cases where the panel lower-side surface portion A22 of each of the plurality of the reduced pressure absorbing panel portions A has a diameter that gradually and slightly increases or decreases downward (i.e., extends in the direction inclined by ±10 degrees or less with respect to the direction along the center axis of the mouth 2).

Figure 4:
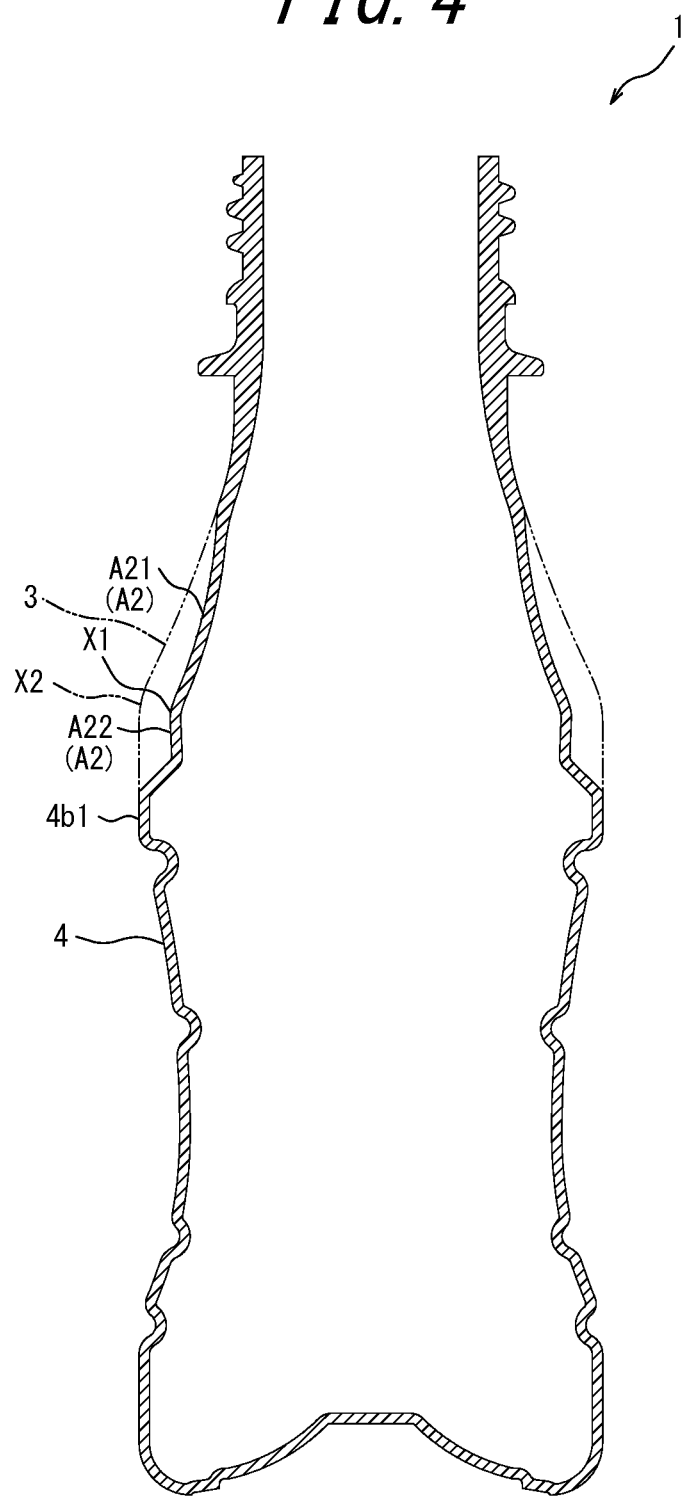
FIG. 4 is an end view taken along Y-Y in FIG. 1.
Figure 5:
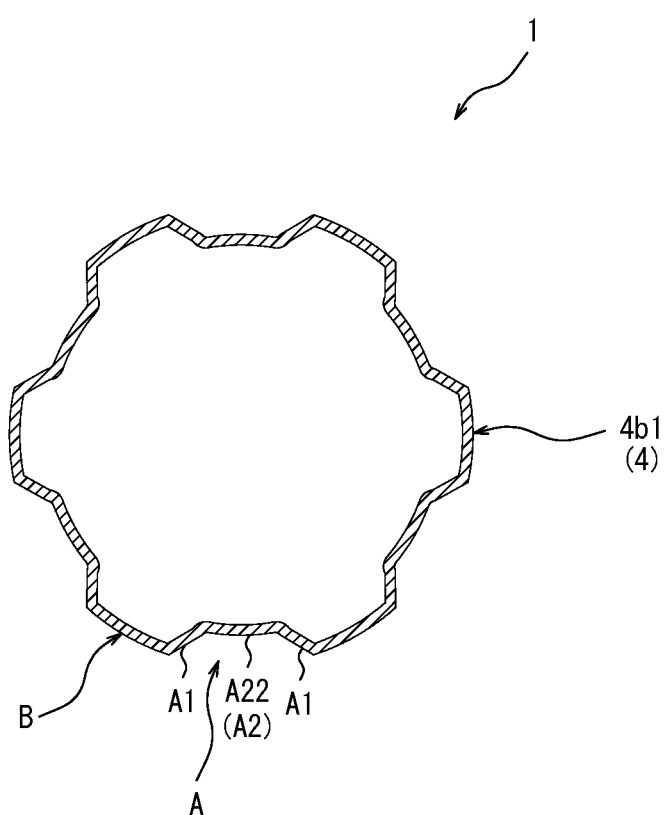
FIG. 5 is an end view taken along Z-Z in FIG. 1.

In the present embodiment, a border portion X1 between the panel upper-side surface portion A21 and the panel lower-side surface portion A22 in each of the plurality of reduced pressure absorbing panel portions A has a height that substantially equals the height of the border portion X2 between the shoulder 3 and the trunk 4 (refer to FIG. 4).

Herein, the "heights" of the border portions X1 and X2 refer to the heights measured from the bottom 5 in the direction along the center axis of the mouth 2. Furthermore, that the "border portion X1 between the panel upper-side surface portion A21 and the panel lower-side surface portion A22 has a height that substantially equals the height of the border portion X2 between the shoulder 3 and the trunk 4" encompasses cases where these heights completely coincide with each other and cases where these heights are offset vertically by, for example, the thickness of the bottle 1 in the border portion X2 between the shoulder 3 and the trunk 4.

However, the border portion X1 between the panel upper-side surface portion A21 and the panel lower-side surface portion A22 in each of the plurality of reduced pressure absorbing panel portions A does not necessarily need to be provided at a height that substantially equals the height of the border portion X2 between the shoulder 3 and the trunk 4 as in the present embodiment.

In the present embodiment, an upper end edge of each of the plurality of reduced pressure absorbing panel portions A corresponds to an upper end edge of the corresponding panel upper-side surface portion A21. However, a panel upper edge portion that is bent to the outer side of the bottle 1 from the upper end edge of the panel upper-side surface portion A21 may also be provided. Furthermore, each reduced pressure absorbing panel portion A has a rectangular shape that is long in the upper-lower direction.

A trunk's middle portion 4b2, which is located between the uppermost peripheral groove 4a and the lowermost peripheral groove 4a in the trunk 4, has a circular drum shape whose diameter decreases toward the middle in the upper-lower direction. Furthermore, similarly to the aforementioned trunk's upper portion 4b1, a trunk's lower portion 4b3, which is located below the lowermost peripheral groove 4a in the trunk 4, has a substantially constant diameter vertically.

As has been described, according to the synthetic resin blow molded bottle 1 in the present embodiment, the reduced pressure absorbing panel portions A are formed in the region extending from the shoulder 3 to the trunk 4 of the bottle 1, and the panel surface portion A2 of each reduced pressure absorbing panel portion A includes the panel upper-side surface portion A21, whose diameter gradually increases downward, and the panel lower-side surface portion A22, which has a substantially constant diameter vertically. Accordingly, especially when the bottle 1 has a small capacity, a sufficient area is secured for the panel surface portion A2 of each reduced pressure absorbing panel portion A, and a sufficient reduced pressure absorbing function is provided.

Furthermore, according to the synthetic resin blow molded bottle 1 in the present embodiment, the height of the border portion X1 between the panel upper-side surface portion A21 and the panel lower-side surface portion A22 in each reduced pressure absorbing panel portion A substantially equals the height of the border portion X2 between the shoulder 3 and the trunk 4. This optimizes the reduced pressure absorbing function of the reduced pressure absorbing panel portions A and prevents occurrence of depression and deformation (plastic deformation) in the shoulder 3.

The description above is merely illustrative of one of embodiments of the present disclosure, and needless to say, various changes may be made within the scope of the claims. For example, although the shoulder, the trunk, the bottom of the bottle 1 have circular cross-sections (i.e., sections taken along planes perpendicular to the center axis of the mouth), the cross-sections may be changed to polygonal, oval, and any other shapes. Furthermore, the shape of each reduced pressure absorbing panel portion A is not limited to rectangular, and a variety of shapes, including elliptical, triangle, and otherwise tear shapes, may be adopted.

The invention claimed is:

1. A synthetic resin blow molded bottle including a cylindrical-shaped mouth, a shoulder that is contiguous with and below the mouth, a trunk that is contiguous with and below the shoulder, and a bottom that closes a lower end of the trunk, wherein
    a plurality of reduced pressure absorbing panel portions and a plurality of column portions are formed alternately in a circumferential direction in a region extending from the shoulder to the trunk,
    each of the plurality of column portions is positioned on a first outer periphery segment having a range of diameters that gradually increases downward in the shoulder and on a second outer periphery segment having a diameter that remains substantially constant vertically in an upper portion of the trunk,
    each of the plurality of reduced pressure absorbing panel portions includes a pair of panel side edge portions, which is bent to an inner side of the bottle from the column portions adjacent thereto, a panel surface portion, which connects the pair of panel side edge portions, and a panel lower edge portion, which is bent to an outer side of the bottle from a lower end edge of the panel surface portion,
    the panel surface portion of each of the plurality of reduced pressure absorbing panel portions includes a panel upper-side surface portion that inclines radially-outward downward, and a panel lower-side surface portion, which connects the panel upper-side surface portion and the panel lower edge portion and which extends substantially vertical and is positioned radially-inward relative to the second outer periphery segment,
    an upper end edge of each of the plurality of reduced pressure absorbing panel portions corresponds to an upper end edge of the corresponding panel upper-side surface portion, and
    each reduced pressure absorbing panel portion has a rectangular shape that is long in an upper-lower direction.

2. The synthetic resin blow molded bottle according to claim 1, wherein
    a border portion between the panel upper-side surface portion and the panel lower-side surface portion in each of the plurality of reduced pressure absorbing panel portions is located at a height that substantially equals a height at which a border portion between the shoulder and the trunk is located.

* * * * *